(12) United States Patent
Kitano et al.

(10) Patent No.: US 11,397,005 B2
(45) Date of Patent: Jul. 26, 2022

(54) FLOW MEASUREMENT DEVICE

(71) Applicant: Panasonic Intellectual Property Management Co., Ltd., Osaka (JP)

(72) Inventors: Yusuke Kitano, Osaka (JP); Mitsuo Yokohata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1044 days.

(21) Appl. No.: 16/070,535

(22) PCT Filed: Nov. 15, 2016

(86) PCT No.: PCT/JP2016/004878
§ 371 (c)(1),
(2) Date: Jul. 17, 2018

(87) PCT Pub. No.: WO2017/130254
PCT Pub. Date: Aug. 3, 2017

(65) Prior Publication Data
US 2019/0024891 A1 Jan. 24, 2019

(30) Foreign Application Priority Data

Jan. 29, 2016 (JP) .............................. JP2016-015689

(51) Int. Cl.
*F23N 5/18* (2006.01)
*G01F 1/66* (2022.01)
(Continued)

(52) U.S. Cl.
CPC ................. *F23N 5/18* (2013.01); *G01F 1/00* (2013.01); *G01F 1/66* (2013.01); *G01F 3/22* (2013.01);
(Continued)

(58) Field of Classification Search
CPC ........ F23N 5/18; F23N 2005/181; G01F 1/00; G01F 1/66; G01F 3/22; G01F 15/00; G01F 15/046; G01F 15/0755
See application file for complete search history.

(56) References Cited

U.S. PATENT DOCUMENTS

2010/0326548 A1* 12/2010 Miyata ..................... G07C 3/00
137/561 R
2012/0221259 A1* 8/2012 Yokohata .............. G01F 15/046
702/45
2013/0312513 A1* 11/2013 Yokohata .................. G01F 3/22
73/198

FOREIGN PATENT DOCUMENTS

EP 2 077 439 7/2009
EP 2 105 715 9/2009
(Continued)

OTHER PUBLICATIONS

Extended European Search Report dated Jan. 7, 2019 in related European Patent Application No. 16887843.7.
(Continued)

*Primary Examiner* — Toan M Le
*Assistant Examiner* — Xiuqin Sun
(74) *Attorney, Agent, or Firm* — Wenderoth, Lind & Ponack, L.L.P.

(57) ABSTRACT

A flow measurement device includes a flow rate measurement unit, an arithmetic unit that calculates a difference value between a the first flow rate value and a second flow rate value, and a difference value conversion unit that calculates a flow rate ratio, based on the difference value. An appliance characteristic extraction unit extracts at least one appliance characteristic quantity indicating a characteristic of a flow rate change and a value calculated from a first flow rate value and a second flow rate value, as an appliance characteristic quantity. Furthermore, an appliance inherent
(Continued)

characteristic information holding unit holds appliance inherent characteristic quantities indicating a characteristic flow rate state of a specific gas appliance, and an appliance discrimination unit discriminates a gas appliance, based on a comparison between the appliance characteristic quantity and the appliance inherent characteristic quantity.

12 Claims, 6 Drawing Sheets

(51) Int. Cl.
*G01F 3/22* (2006.01)
*G01F 1/00* (2022.01)
*G01F 15/075* (2006.01)
*G01F 15/00* (2006.01)
*G01F 15/04* (2006.01)

(52) U.S. Cl.
CPC ............ *G01F 15/00* (2013.01); *G01F 15/046* (2013.01); *G01F 15/0755* (2013.01); *F23N 2005/181* (2013.01)

(56) References Cited

FOREIGN PATENT DOCUMENTS

| | | |
|---|---|---|
| EP | 2 163 865 | 3/2010 |
| EP | 2 498 071 | 9/2012 |
| JP | 2011-095200 | 5/2011 |

OTHER PUBLICATIONS

International Search Report of PCT application No. PCT/JP2016/004878 dated Jan. 24, 2017.
Extended European Search Report dated Nov. 29, 2019 in related European Patent Application No. 16887843.7.

\* cited by examiner

FLOW MEASUREMENT DEVICE

This application is a U.S. national stage application of the PCT International Application No. PCT/JP2016/004878 filed on Nov. 15, 2016, which claims the benefit of foreign priority of Japanese patent application No. 2016-015689 filed on Jan. 29, 2016, the contents all of which are incorporated herein by reference.

TECHNICAL FIELD

The present invention relates to a technique for detecting a change in a flow rate of gas so as to discriminate a gas appliance which starts to be used.

BACKGROUND ART

A gas meter device has been proposed which identifies which gas appliance starts to be used based on a flow rate change in gas flowing in a pipe. For example, PTL 1 below discloses a gas meter device in which a gas flow rate is measured at a prescribed time interval and a change pattern of an obtained flow rate value is compared with a change pattern of a flow rate value previously obtained for each gas appliance so as to discriminate the gas appliance which starts to be used.

PTL 1 proposes to improve discriminating accuracy by using the flow rate indicating a characteristic of the gas appliance so as to discriminate the gas appliance. For reference, all disclosure contents of Japanese Patent Unexamined Publication No. 2011-095200 are incorporated herein by reference. PTL 1 illustrates an intermediate stable flow rate as one of the flow rates indicating the characteristic of the gas appliance. In the pattern of the flow rate change acquired at a prescribed time interval, the intermediate stable flow rate represents the flow rate, which corresponds to a region having a relatively low increase rate of the flow rate, and which appears during a period until the flow rate is stabilized to have a substantially constant value from rising of the flow rate immediately after the gas appliance starts to be used. In other words, the intermediate stable flow rate is the flow rate corresponding to a flat portion in the course of the flow rate increase in the pattern of the flow rate change. For example, the gas appliance which performs a slow ignition operation, such as a gas fan heater, typically shows the pattern of the flow rate change in this way. The slow ignition operation means an ignition operation performed in a state where gas pressure is suppressed in order to prevent explosive ignition.

However, even if the gas appliance which starts to be used is an appliance for performing the slow ignition operation, a flat portion in the pattern of the flow rate change cannot be detected in some cases. For example, depending on a magnitude of a time lag between a timing the gas appliance starts to be used, that is, the rising of the flow rate, and a timing that the gas flow rate is acquired, the flat portion does not appear in the pattern of the flow rate change. Consequently, it is difficult to calculate the intermediate stable flow rate in some cases. In this case, PTL 1 described above proposes to use a "ratio" calculated based on flow rate value $Q(n)$ obtained at a certain measurement timing and flow rate value $Q(n-1)$ obtained at an earlier measurement timing immediately before the certain measurement timing. Specifically, Expression (1) below is used so as to calculate ratio P. When ratio P falls within a predetermined range (for example, within ±15%), an average of $Q(n)$ and $Q(n-1)$ is acquired as an "intermediate flow rate". Then, instead of the above-described intermediate stable flow rate, the intermediate flow rate is used so as to discriminate the gas appliance.

$$P=100*(1-(Q(n)/Q(n-1))) \tag{1}$$

(In Expression, "*" represents multiplication)

CITATION LIST

Patent Literature

PTL 1: Japanese Patent Unexamined Publication No. 2011-095200

SUMMARY OF THE INVENTION

However, when the gas appliance is discriminated simply using ratio P described above, in a case where a portion having a low increase rate of the flow rate accidentally appears in a zone having a relatively high flow rate, there is a possibility that the intermediate flow rate cannot be correctly acquired. The present invention aims to provide a flow measurement device which can more reliably acquire a flow rate indicating a characteristic of a gas appliance.

An exemplary flow measurement device according to the present specification includes a flow rate measurement unit that measures a flow rate of gas at a prescribed time interval, the gas flowing through a flow path, an arithmetic unit that calculates a difference value between a first flow rate value measured at a certain measurement timing and a second flow rate value measured at a measurement timing immediately prior to the certain measurement timing, and a difference value conversion unit that calculates a flow rate ratio, based on the difference value. In addition, the flow measurement device includes an appliance characteristic extraction unit that extracts at least one appliance characteristic quantity indicating a characteristic of a flow rate change in a currently using gas appliance, and that extracts a value calculated from the first flow rate value and the second flow rate value as at least one appliance characteristic quantity, in a case where the flow rate ratio falls within a reference range. Furthermore, the flow measurement device includes an appliance inherent characteristic information holding unit that holds one or more appliance inherent characteristic quantities indicating a characteristic flow rate state of a specific gas appliance, and an appliance discrimination unit that discriminates the currently using gas appliance, based on a comparison between the appliance characteristic quantity extracted by the appliance characteristic extraction unit and the appliance inherent characteristic quantity corresponding to the appliance characteristic quantity out of the one or more appliance inherent characteristic quantities held by the appliance inherent characteristic information holding unit. Then, a plurality of flow rate zones are set to correspond to the flow rate of the gas flowing through the flow path, and the reference range is determined in accordance with a flow rate zone to which the first flow rate value belongs, the flow rate zone being included in the plurality of flow rate zones.

According to the flow measurement device of the present invention, this configuration enables the flow measurement device to more reliably acquire the flow rate indicating the characteristic of the gas appliance.

DESCRIPTION OF EMBODIMENT

Figure 1:
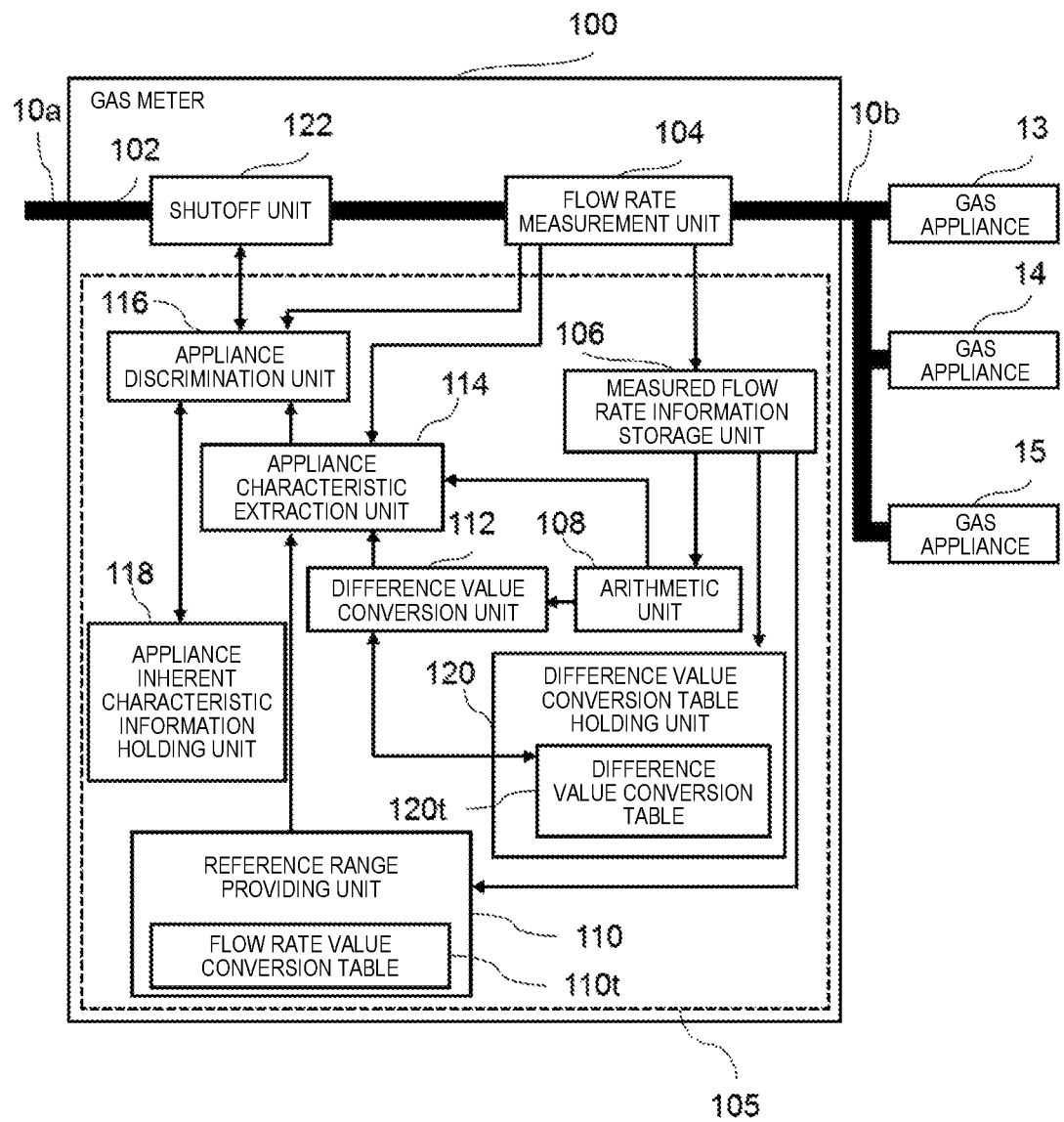
FIG. 1 is a block diagram illustrating an exemplary configuration of a gas meter according to an exemplary embodiment of the present invention.

Hereinafter, an exemplary embodiment of a flow measurement device according to the present invention will be described with reference to the accompanying drawings. In the exemplary embodiment described below, a gas meter will be described as an example of the flow measurement device, and processing thereof will be described. In the drawings, the same reference numerals will be given to the same configuration elements, and repeated description of the previously described configuration elements will be omitted. The present invention is not limited to the exemplary embodiment described below.

(Exemplary Configuration of Flow Measurement Device)

FIG. 1 illustrates a configuration example of gas meter 100 according to the exemplary embodiment of the present invention. Gas meter 100 internally has flow path 102, and is used in a state of being connected to gas pipe 10a for supplying gas. Gas meter 100 is located between gas pipe 10a and a plurality of gas appliances (a gas stove, a gas fan heater, and a water heater). FIG. 1 illustrates a state where one end of flow path 102 of gas meter 100 is connected to gas pipe 10a on an upstream side and the other end of flow path 102 is connected to gas pipe 10b on a downstream side. Here, gas appliances 13, 14, and 15 are connected to gas pipe 10b.

In a configuration illustrated in FIG. 1, gas meter 100 schematically has flow rate measurement unit 104 located in an intermediate portion of the flow path, and control unit 105. Flow rate measurement unit 104 measures a flow rate of gas at a prescribed time interval, the gas flowing through flow path 102 (hereinafter, referred to as a "sampling interval" in some cases). For example, the sampling interval is 0.5 seconds. For example, as flow rate measurement unit 104, an ultrasonic flowmeter can be applied. The ultrasonic flowmeter measures an instantaneous flow rate of the gas by emitting ultrasonic waves to the gas flowing in flow path 102 at a prescribed time interval and by calculating a propagation time difference caused by a gas flow. Fluctuations in a usage amount of the gas can be detected by acquiring data indicating the flow rate at a prescribed time interval which is detected by flow rate measurement unit 104.

In the configuration illustrated in FIG. 1, control unit 105 has measured flow rate information storage unit 106, arithmetic unit 108, difference value conversion unit 112, appliance characteristic extraction unit 114, appliance inherent characteristic information holding unit 118, and appliance discrimination unit 116. In the illustrated example, control unit 105 further has reference range providing unit 110 and difference value conversion table holding unit 120. A typical example of an operation of gas meter 100 will be described later.

In this example, gas meter 100 has shutoff unit 122 located between gas pipe 10a and flow rate measurement unit 104. When an abnormal increase in the flow rate of the gas is detected, based on control of control unit 105, shutoff unit 122 stops gas supply to gas appliances 13, 14, and 15 connected to gas pipe 10b. For example, as shutoff unit 122, a shutoff valve can be used.

Arithmetic unit 108 calculates a difference value at each sampling interval, based on the flow rate value acquired by flow rate measurement unit 104. That is, when the flow rate value at a certain measurement timing is set to Q(n) and the flow rate value at a measurement timing immediately prior to than the certain measurement timing is set to Q(n−1), arithmetic unit 108 calculates difference value D(n)=Q(n)−Q(n−1) corresponding to each measurement timing. Difference value conversion unit 112 calculates flow rate ratio R(n), based on difference value D(n) described above. For example, flow rate ratio R(n) can be defined by Expression (2) below.

$$R(n)=100*|(Q(n)-Q(n-1))/Q(n-1)| \quad (2)$$

Hereinafter, an example using Expression (2) as the definition of flow rate ratio R(n) will be described. As a matter of course, the definition of flow rate ratio R(n) is not limited to Expression (2) above. For example, flow rate ratio R(n) may be defined by Expression (3) below.

$$R(n)=100*|(Q(n)-Q(n-1))/Q(n)| \quad (3)$$

Measured flow rate information storage unit 106 is used as a temporary memory in calculating difference value D(n) and flow rate ratio R(n) described above. Measured flow rate information storage unit 106 may be located inside control unit 105 or outside control unit 105.

Appliance characteristic extraction unit 114 extracts an appliance characteristic quantity indicating a characteristic of a flow rate change in a currently using gas appliance. As the appliance characteristic quantity, a value calculated from the flow rate value at two adjacent measurement timings can be used. Here, as the appliance characteristic quantity, an average of flow rate values at two adjacent measurement timings will be described as an example. That is, average A(n)=(Q(n)−Q(n−1))/2 at a certain measurement timing is acquired as the appliance characteristic quantity. Average A(n) may be calculated by any one of arithmetic unit 108, difference value conversion unit 112, and appliance characteristic extraction unit 114. The number (type) of the appliance characteristic quantities extracted by appliance characteristic extraction unit 114 is not limited to one. Appliance characteristic extraction unit 114 can extract two or more appliance characteristic quantities.

According to a typical exemplary embodiment of the present invention, appliance characteristic extraction unit 114 extracts the appliance characteristic quantity (here, average A(n)), in a case where flow rate ratio R(n) calculated corresponding to each measurement timing by difference value conversion unit 112 falls within a reference range. As will be described in detail later, according to the exemplary embodiment described here, a plurality of flow rate zones are set in accordance with the flow rate of the gas flowing through flow path 102. The above-described reference range is determined in accordance with the flow rate zone to which the measured flow rate value belongs.

Appliance discrimination unit 116 discriminates the gas appliance which starts to be used, by comparing the appliance characteristic quantity extracted by appliance characteristic extraction unit 114 and the appliance inherent characteristic quantity indicating the characteristic flow rate state of the specific gas appliance. The appliance inherent characteristic quantity is pre-stored in appliance inherent characteristic information holding unit 118. For example, in a case of detecting a gas fan heater which starts to be used, one or more appliance inherent characteristic quantities corresponding to the gas fan heater are pre-stored in appliance inherent characteristic information holding unit 118. According to one aspect, appliance inherent characteristic information holding unit 118 pre-holds an intermediate flow rate of the gas appliance to be detected, as the appliance inherent characteristic quantity.

(Typical Example of Discriminating Operation)

Hereinafter, a typical example of a discriminating operation in the flow measurement device will be described with reference to the drawings.

Figure 2:
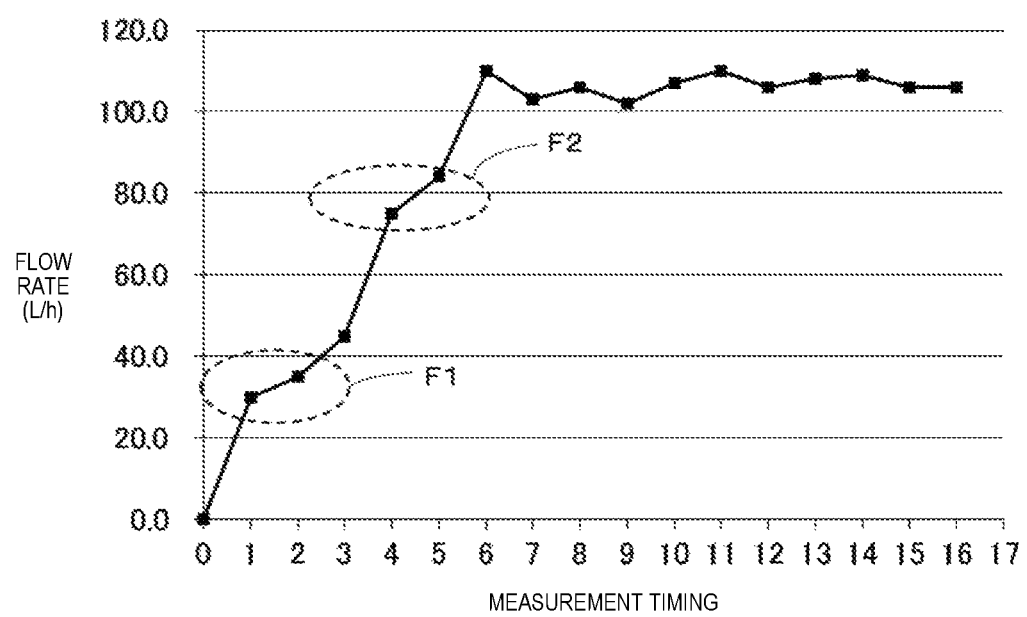
FIG. 2 is a graph illustrating an example of a pattern of a flow rate change when a gas appliance starts to be used.

FIG. 2 illustrates an example of a pattern of the flow rate change when the gas appliance starts to be used. In FIG. 2, 17 flow rate values measured at a sampling interval of 0.5 seconds are plotted. That is, here, the flow rate change of the gas for 8 seconds after the gas appliance starts to be used is illustrated.

In the example illustrated in FIG. 2, a gas flow rate roughly increases between measurement timings "0" to "6", and thereafter, the gas flow rate is in transition at approximately 105 L/h. In this example, in the pattern of the flow rate change, a region having a relatively low increase rate of the flow rate appears in a portion between measurement timings "1" and "2" (portion enclosed by broken line F1) and a portion between measurement timings "4" and "5" (portion enclosed by broken line F2). Here, the portion enclosed by broken line F2 is a portion where the flow rate change is accidentally small. In this example, a target to be detected as the intermediate flow rate is the flow rate corresponding to the portion enclosed by broken line F1.

For reference, Table 1 below illustrates flow rate value Q(n) at each measurement timing of the graph illustrated in FIG. 2, difference value D(n) described above, ratio P calculated based on Expression (1), and flow rate ratio R(n) calculated based on Expression (2) (here, n=0 to 16). As can be understood from Table 1, in this example, flow rate ratio R(n) is equal to an absolute value of ratio P. For simple understanding, this example shows a case where the first measurement timing coincides with the timing that the gas appliance starts to be used. Therefore, Q(0)=0.0, and ratio P and flow rate ratio R(1) at measurement timing "1" do not show a specific value since the denominator becomes zero.

TABLE 1

| Measurement Timing | Q(n) (L/h) | D(n) (L/h) | P (%) | R(n) (%) |
|---|---|---|---|---|
| 0 | 0.0 | — | — | — |
| 1 | 30.0 | 30.00 | — | — |
| 2 | 35.0 | 5.00 | −16.67 | 16.67 |
| 3 | 45.0 | 10.00 | −28.57 | 28.57 |
| 4 | 75.0 | 30.00 | −66.67 | 66.67 |
| 5 | 84.0 | 9.00 | −12.00 | 12.00 |
| 6 | 110.0 | 26.00 | −30.95 | 30.95 |
| 7 | 103.0 | −7.00 | 6.36 | 6.36 |
| 8 | 106.0 | 3.00 | −2.91 | 2.91 |
| 9 | 102.0 | −4.00 | 3.77 | 3.77 |
| 10 | 107.0 | 5.00 | −4.90 | 4.90 |
| 11 | 110.0 | 3.00 | −2.80 | 2.80 |
| 12 | 106.0 | −4.00 | 3.64 | 3.64 |

TABLE 1-continued

| Measurement Timing | Q(n) (L/h) | D(n) (L/h) | P (%) | R(n) (%) |
|---|---|---|---|---|
| 13 | 108.0 | 2.00 | −1.89 | 1.89 |
| 14 | 109.0 | 1.00 | −0.93 | 0.93 |
| 15 | 106.0 | −3.00 | 2.75 | 2.75 |
| 16 | 106.0 | 0.00 | 0.00 | 0.00 |

Table 1 should be noted in that the flow rate change at the sampling interval is greatly reflected in ratio P, even though difference value D(n) of the flow rate is small in a zone having a relatively low flow rate. For example, whereas difference value D(5) at measurement timing "5" is 9.00 L/h, difference value D(2) at measurement timing "2" is 5.00 L/h smaller than 9.00 L/h. However, absolute value (16.67%) of ratio P at measurement timing "2" is greater than absolute value (12.00%) of ratio P at measurement timing "5". Therefore, according to the method disclosed in PTL 1, in a case where the predetermined range is set to 15%, ratio P at measurement timing "2" is out of the predetermined range, and ratio P at measurement timing "5" is within the predetermined range. Average 79.5 L/h of flow rate value 84.0 L/h at measurement timing "5" and flow rate value 75.0 L/h at measurement timing "4" immediately prior to measurement timing "5" are extracted as the intermediate flow rate. That is, it is not possible to detect a portion to be captured as a portion corresponding to the slow ignition in the pattern of the flow rate change. Instead, a value different from 32.5 L/h which has to be originally extracted as the intermediate flow rate and which is the average of Q(2) and Q(1) is extracted as the intermediate flow rate.

The reason is as follows. In a case of using the ratio based on the flow rate value at two consecutive measurement timings, as the flow rate value used in calculating the ratio is smaller, the change in the flow rate value is more strongly reflected in the ratio. For example, whereas the absolute value of ratio P is 20% when the flow rate value is changed from 100 L/h to 120 L/h at the sampling interval, the flow rate value at the sampling interval increases only from 10 L/h to 12 L/h in the zone having the lower flow rate. In this way, the absolute value of ratio P becomes 20%. That is, in the zone having the lower flow rate, only a small flow rate change enables a greater ratio of the absolute value to be obtained. According to PTL 1 described above, a fact that the ratio is affected by the flow rate change due to a difference in the flow rate zones is not taken into account.

In contrast, as will be described in detail below, according to the exemplary embodiment of the present invention, it is determined whether flow rate ratio R(n) falls within the reference range. In a case where flow rate ratio R(n) falls within the reference range, the appliance characteristic quantity is extracted. In this case, the portion corresponding to the slow ignition in the pattern of the flow rate change can be more reliably captured by using the reference range determined in accordance with the flow rate zone to which the measured flow rate value belongs.

Referring back to FIG. 1, description will be continued. Appliance characteristic extraction unit 114 acquires data of the reference range corresponding to the flow rate zone to which the measured flow rate value belongs, from reference range providing unit 110. For example, reference range providing unit 110 pre-holds flow rate value conversion table 110t having a written reference range for each of a plurality of classifications, which corresponds to a size of the flow rate value being measured. For example, reference range providing unit 110 acquires flow rate value Q(n) from measured flow rate information storage unit 106, and refers to flow rate value conversion table 110t so as to supply appliance characteristic extraction unit 114 with the data of the reference range corresponding to the flow rate zone to which flow rate value Q(n) belongs. In a case where flow rate ratio R(n) calculated by difference value conversion unit 112 falls within the reference range, for example, appliance characteristic extraction unit 114 extracts average A(n) described above as the appliance characteristic quantity.

Table 2 below illustrates an example of flow rate value conversion table 110t. As illustrated in Table 2, the reference range in a certain flow rate zone (for example, from a first flow rate to a second flow rate) is wider than the reference range in a flow rate zone (for example, from the second flow rate to a third flow rate) having a higher flow rate than the certain flow rate zone. In the example illustrated in Table 2, the reference range is further narrowed in the flow rate zone having the higher flow rate. However, the reference range does not necessarily have to be narrowed monotonically as the flow rate value increases.

TABLE 2

| Flow Rate Zone | Reference Range (%) |
|---|---|
| 0 ≤ Q(n) < 20 | 25 |
| 20 ≤ Q(n) < 40 | 20 |
| 40 ≤ Q(n) < 60 | 15 |
| 60 ≤ Q(n) < 80 | 13 |
| 80 ≤ Q(n) < 90 | 10 |
| 90 ≤ Q(n) < 100 | 5 |
| 100 ≤ Q(n) < 105 | 2 |
| 105 ≤ Q(n) | 0.5 |

In the example illustrated in FIG. 2, Q(2)=35.0 L/h (refer to Table 1) is satisfied, and the reference range in this case is 20%. Appliance characteristic extraction unit 114 determines whether or not flow rate ratio R(2) at measurement timing "2" falls within 20% serving as the reference range. As illustrated in Table 1, here, 16.67% serving as R(2) falls within 20% serving as the reference range. Therefore, appliance characteristic extraction unit 114 extracts A(2)=32.5 L/h serving as the average of flow rate values Q(2) and Q(1), as the appliance characteristic quantity.

As will be understood with reference to Table 1 and Table 2, at measurement timings "2" to "15", flow rate ratio R(n) is out of the reference range. For example, the reference range corresponding to Q(5) is 10%, and in this case, R(5)=12.00% exceeds 10% serving as the reference range. Therefore, average A(5) is not adopted as the appliance characteristic quantity. As a result, A(2)=32.5 L/h can be acquired as the appliance characteristic quantity. Value of A(2) can be used as the intermediate flow rate so as to discriminate the gas appliance.

There is no particular restriction on the processes after the intermediate flow rate is obtained. For example, in a case of discriminating the gas fan heater, the gas stove, and the water heater, appliance inherent characteristic information holding unit 118 can pre-store the intermediate flow rates (or the intermediate stable flow rates) respectively corresponding to the gas fan heater, the gas stove, and the water heater, as the appliance inherent characteristic quantity. Appliance characteristic extraction unit 114 discriminates the gas appliance which starts to be used, by comparing the extracted appliance characteristic quantity (here, average A(2) as the intermediate flow rate) and the appliance inherent characteristic quantity (here, the intermediate flow rate or the intermediate stable flow rate) held by appliance inherent characteristic information holding unit 118. For example, when the intermediate flow rate serving as the appliance characteristic quantity falls within ±10% centered on the intermediate flow rate (or the intermediate stable flow rate) registered in appliance inherent characteristic information holding unit 118 as the appliance inherent characteristic quantity of the gas fan heater, the gas appliance which starts to be used can be determined as the gas fan heater.

According to the exemplary embodiment described here, in a case where flow rate ratio R(n) calculated corresponding to each measurement timing falls within the reference range corresponding to flow rate value Q(n) corresponding to the measurement timing, the appliance characteristic quantity is extracted. Accordingly, the flow rate indicating the characteristic of the gas appliance (average A(i) serving as the intermediate flow rate in the above-described example) can be more reliably acquired. In this way, the characteristic of the flow rate change in the currently using gas appliance can be more reliably extracted by changing a width of the reference range serving as a reference for determining whether or not to extract the appliance characteristic quantity in accordance with the flow rate zone to which the measured gas flow rate belongs.

As a matter of course, the number of classifications in flow rate value conversion table 110t, the lower and upper limits of the flow rate value in each classification, and the value of the reference range corresponding to each classification are not limited to the examples described here. These may be optionally set depending on the gas appliance to be detected. For example, in the flow rate zone having the relatively low flow rate, the classification may be more minutely set.

In a case where flow rate value Q(n) is in a range from the first predetermined flow rate (for example, 20 L/h) to the second predetermined flow rate (for example, 60 L/h), flow rate ratio R(n) (or difference value D(n)) may be calculated. That is, in a case where flow rate value Q(n) is smaller than the first predetermined flow rate (for example, 20 L/h) or exceeds the second predetermined flow rate (for example, 60 L/h), flow rate ratio R(n) (or difference value D(n)) may not be calculated. In this manner, it is possible to avoid a possibility that the stable flow rate corresponding to the region where the flow rate change is substantially constant and stable (in this example, subsequent to measurement timing "6") may be extracted as the intermediate flow rate. For example, in the example illustrated in FIG. 2, difference value D(16) of the flow rate between measurement timing "15" and measurement timing "16" is accidentally 0.0 L/h, and R(16) falls within 0.5% serving as the reference range corresponding to Q(16). In a case where flow rate value Q(n) is in a range from the first predetermined flow rate (for example, 20 L/h) to the second predetermined flow rate (for example, 60 L/h), control is performed so as to calculate flow rate ratio R(n) (or difference value D(n)). In this manner, it is possible to prevent average A(n) from being extracted as the intermediate flow rate after the flow rate is stabilized.

Alternatively, in a case where the intermediate flow rate can be acquired as the appliance characteristic quantity, subsequent monitoring of the intermediate flow rate may be stopped. For example, after the appliance characteristic quantity (A(2)=32.5 L/h in the above-described example) is extracted by appliance characteristic extraction unit 114, flow rate ratio R(n) (or difference value D(n)) may not be calculated. Through this control, it is possible to expect an advantageous effect such as a faster operation and power saving. The monitoring of the intermediate flow rate may be temporarily stopped. For example, if necessary, the monitoring of the intermediate flow rate may be resumed.

Figure 3:
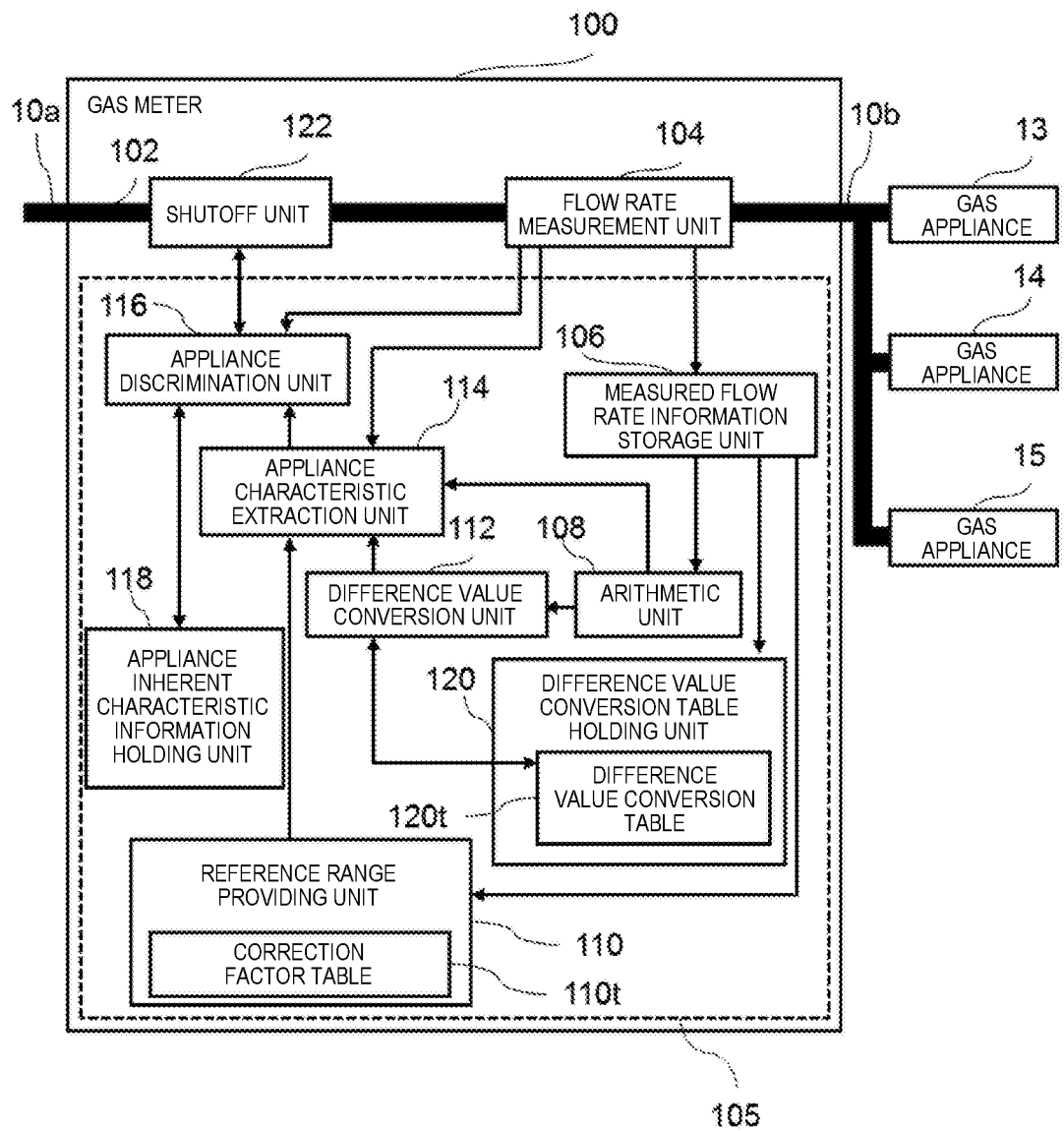
FIG. 3 is a block diagram illustrating a modification example of a gas meter according to an exemplary embodiment of the present invention.

FIG. 3 illustrates a modification example of gas meter 100. A different point between the configuration illustrated in FIG. 3 and the configuration described with reference to FIG. 1 is as follows. Reference range providing unit 110 holds correction factor table 111t instead of flow rate value conversion table 110t. Correction factor table 111t has a correction factor written therein for each of a plurality of classifications corresponding to a size of the measured flow rate value.

In the configuration illustrated in FIG. 3, reference range providing unit 110 refers to correction factor table 111t, and multiplies reference data by the correction factor corresponding to the flow rate zone to which the measured flow rate value belongs. In this manner, reference range providing unit 110 determines the reference range corresponding to the flow rate zone to which the measured flow rate value belongs. For example, the reference data here is a fixed reference range (for example, 15%). This control also enables appliance characteristic extraction unit 114 to obtain the reference range corresponding to the flow rate zone to which the measured flow rate value belongs, from reference range providing unit 110.

Figure 4:
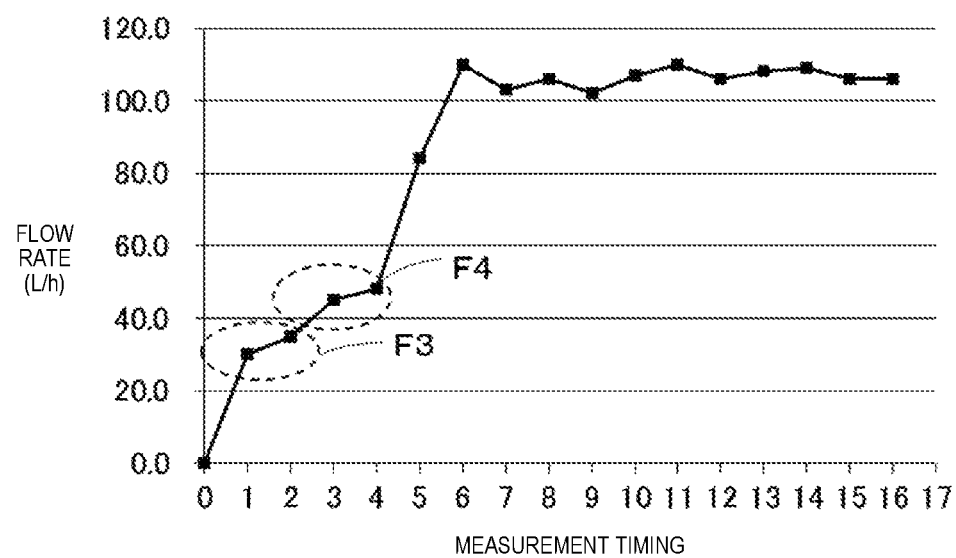
FIG. 4 is a graph illustrating another example of the pattern of the flow rate change when the gas appliance starts to be used.

FIG. 4 illustrates another example of a pattern of the flow rate change when the gas appliance starts to be used. For reference, Table 3 below illustrates flow rate value Q(n) at each measurement timing illustrated in FIG. 4, difference value D(n) described above, and flow rate ratio R(n) calculated based on Expression (2).

TABLE 3

| Measurement Timing | Q(n) (L/h) | D(n) (L/h) | R(n) (%) |
|---|---|---|---|
| 0 | 0.0 | — | — |
| 1 | 30.0 | 30.00 | — |
| 2 | 35.0 | 5.00 | 16.67 |
| 3 | 45.0 | 10.00 | 28.57 |
| 4 | 48.0 | 3.00 | 6.67 |
| 5 | 84.0 | 36.00 | 75.00 |
| 6 | 110.0 | 26.00 | 30.95 |
| 7 | 103.0 | −7.00 | 6.36 |
| 8 | 106.0 | 3.00 | 2.91 |
| 9 | 102.0 | −4.00 | 3.77 |
| 10 | 107.0 | 5.00 | 4.90 |
| 11 | 110.0 | 3.00 | 2.80 |
| 12 | 106.0 | −4.00 | 3.64 |
| 13 | 108.0 | 2.00 | 1.89 |
| 14 | 109.0 | 1.00 | 0.93 |
| 15 | 106.0 | −3.00 | 2.75 |
| 16 | 106.0 | 0.00 | 0.00 |

In this example, in the pattern of the flow rate change, a region having a relatively low increase rate of the flow rate appears in a portion between measurement timings "1" and "2" (portion enclosed by broken line F3 in FIG. 4) and a portion between measurement timings "3" and "4" (portion enclosed by broken line F4 in FIG. 4). As will be understood with reference to Table 2 described above, a value of 16.67% serving as R(2) falls within 20% serving as the reference range corresponding to flow rate value Q(2). Therefore, a value of average A(2) corresponding to measurement timing "2" is a candidate for the intermediate flow rate as the appliance characteristic quantity. In this example, a value of 6.67% serving as R(4) falls within 15% serving as the reference range corresponding to flow rate value Q(4). However, a value of R(4) is closer to zero than R(2). In this case, as the intermediate flow rate, there is a high possibility that A(4) may be more suitable than A(2). That is, there is a possibility that the discriminating accuracy may be improved adopting average A(4) instead of average A(2).

In this way, in the state where the appliance characteristic quantity (for example, average A(k)) corresponding to certain measurement timing "k" is previously extracted as the appliance characteristic quantity, in a case where flow rate ratio R(h) corresponding to flow rate value Q(h) measured later than measurement timing "k" is closer to zero than flow rate ratio R(k) corresponding to measurement timing "k", the previously extracted appliance characteristic quantity may be updated to a new value. For example, appliance characteristic extraction unit 114 may rewrite the previous appliance characteristic quantity (for example, A(k)) with the appliance characteristic quantity (for example, A(h)) corresponding to measurement timing "h" later than measurement timing "k". Flow rate ratio R(h) corresponding to measurement timing "h" may be selectively calculated in a case where flow rate value Q(h) is in the range from the first predetermined flow rate to the second predetermined flow rate.

In a case where the appliance characteristic quantity is previously updated, difference value conversion unit 112 may stop calculating subsequent flow rate ratio R(n), or arithmetic unit 108 may stop calculating subsequent difference value D(n). In a case where flow rate ratio R(h) corresponding to measurement timing "h" later than measurement timing "k" is farther away from zero than flow rate ratio R(k), in a case where flow rate ratio R(h) is out of the reference range corresponding to the flow rate zone to which flow rate value Q(h) belongs, and in a case where flow rate value Q(h) exceeds the second predetermined flow rate, the previously extracted appliance characteristic quantity does not need to be updated that much. Therefore, in these cases, the monitoring of the intermediate flow rate may be stopped after the appliance characteristic quantity is extracted.

Figure 5:
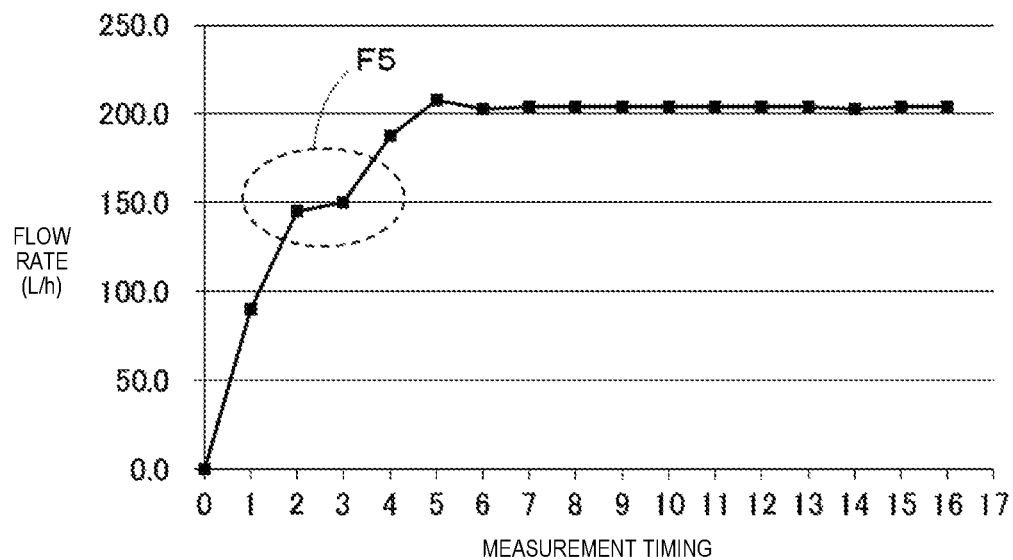
FIG. 5 is a graph illustrating still another example of the pattern of the flow rate change when the gas appliance starts to be used.

Here, referring to FIG. 5 and FIG. 6, another example of detecting a portion corresponding to the slow ignition in the pattern of the flow rate change will be described. FIG. 5 illustrates still another example of a pattern of the flow rate change when the gas appliance starts to be used. For reference, Table 4 below illustrates flow rate value Q(n) at each measurement timing illustrated in FIG. 5, difference value D(n) described above, and flow rate ratio R(n) calculated based on Expression (2).

TABLE 4

| Measurement Timing | Q(n) (L/h) | D(n) (L/h) | R(n) (%) |
|---|---|---|---|
| 0 | 0.0 | — | — |
| 1 | 90.0 | 90.00 | — |
| 2 | 145.0 | 55.00 | 61.11 |
| 3 | 150.0 | 5.00 | 3.45 |
| 4 | 188.0 | 38.00 | 25.33 |
| 5 | 208.0 | 20.00 | 10.64 |
| 6 | 203.0 | −5.00 | 2.40 |
| 7 | 204.0 | 1.00 | 0.49 |
| 8 | 204.0 | 0.00 | 0.00 |
| 9 | 204.0 | 0.00 | 0.00 |
| 10 | 204.0 | 0.00 | 0.00 |
| 11 | 204.0 | 0.00 | 0.00 |
| 12 | 204.0 | 0.00 | 0.00 |
| 13 | 204.0 | 0.00 | 0.00 |
| 14 | 203.0 | −1.00 | 0.49 |
| 15 | 204.0 | 1.00 | 0.49 |
| 16 | 204.0 | 0.00 | 0.00 |

In this example, the gas flow rate roughly increases during measurement timings "0" to "5", and thereafter, the gas flow rate is in transition at approximately 204 L/h. A region having a relatively low increase rate of the flow rate appears in a portion during measurement timings "0" to "5" and a portion between measurement timings "2" and "3" (portion enclosed by broken line F5 in FIG. 5). As can be understood from FIG. 5, a flow rate change ratio (may be referred to as a flow rate ratio) between measurement timing "2" and measurement timing "3" is relatively low. Therefore, it is conceivable that this portion in the pattern of the flow rate change corresponds to the slow ignition.

Figure 6:
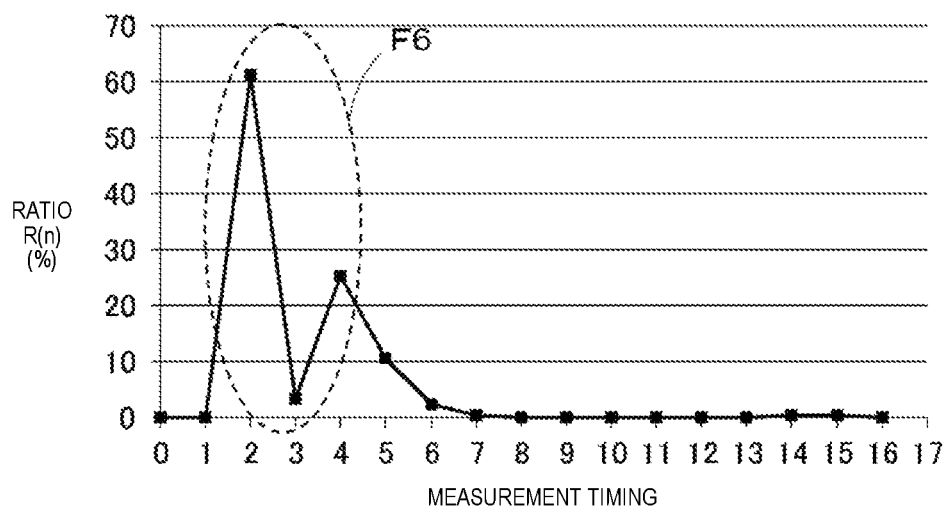
FIG. 6 is a graph illustrating temporal transition of flow rate ratio R(n) calculated from flow rate value Q(n) illustrated in Table 4.

FIG. 6 illustrates a temporal transition of flow rate ratio R(n) calculated from flow rate value Q(n) illustrated in Table 4. As illustrated in FIG. 6, if a region having the relatively low flow rate change ratio exists during a period (here, during measurement timings "0" to "5") where the flow rate value increases until the gas flow rate is stabilized, a transition of decrease-increase-decrease (portion enclosed by broken line F6 in FIG. 6) appears in a graph of flow rate ratio R(n). Therefore, from a viewpoint of calculating the intermediate flow rate, the transition of decrease-increase-decrease (hereinafter, referred to as a "V-shaped transition") may be detected in the graph of flow rate ratio R(n).

In an aspect, appliance characteristic extraction unit 114 detects the transition of decrease-increase-decrease in the pattern of flow rate ratio R(n). For example, appliance characteristic extraction unit 114 determines whether or not the flow rate ratio shows a decrease as much as a first predetermined value (for example, 50%) or more at two mutually adjacent measurement timings.

In this example, the flow rate ratio shows a decrease as much as 50% or more between measurement timing "2" and "3" (R(3)−R(2)≥50%). In addition, appliance characteristic extraction unit 114 determines whether or not the flow rate ratio shows an increase as much as a second predetermined value (for example, 20%) or more at two mutually adjacent measurement timings after the flow rate ratio decreases as much as the first predetermined value or more. In this example, the flow rate ratio shows an increase as much as 20% or more between measurement timing "3" and "4" (R(4)−R(3)≥20%). Based on these transitions, it can be understood that the V-shaped transition appears during measurement timing "2" to "4". A rapid decrease in the flow rate ratio suggests that the increasing rate of the flow rate is rapidly lowered in the pattern of the flow rate change, and a rapid increase in the flow rate ratio suggests that the increasing rate of the flow rate is rapidly raised in the pattern of the flow rate change. That is, it is conceivable that the slow ignition operation is performed during measurement timing "2" to "4".

For example, appliance characteristic extraction unit 114 calculates the intermediate flow rate as the appliance characteristic quantity, based on flow rate value Q(3) at a measurement timing (here, measurement timing "3") of a valley portion interposed between two peaks in a graph of flow rate ratio R(n) and flow rate value Q(2) at the measurement timing (here, measurement timing "2" corresponding to a first peak) immediately prior to measurement timing "3". That is, here, average A(3) corresponding to measurement timing "3" is calculated as the intermediate flow rate. In this way, the portion corresponding to the slow ignition in the pattern of the flow rate change can also be detected by detecting the V-shaped transition in the graph of flow rate ratio R(n).

The decrease and increase in the transition of decrease-increase-decrease of the flow rate ratio R(n) may be continuous or may not be continuous. For example, a case is assumed as follows. The flow rate ratio shows a decrease as much as the first predetermined value or more between two mutually adjacent measurement timing "a" and "b", and the flow rate ratio shows an increase as much as the second predetermined value or more between two mutually adjacent measurement timing "x" and "y". In this case, as the appliance characteristic quantity, it is possible to use a value calculated from the flow rate value used in calculating the flow rate ratio corresponding to at least one measurement timing of measurement timings "b" to "x". For example, an average of the flow rate value Q(b), . . . , Q(x) at measurement timing "b" to "x" may be used as the appliance characteristic quantity.

(Appliance Discrimination Using Code)

In the configuration illustrated in FIGS. 1 and 3, control unit 105 has difference value conversion table holding unit 120. Difference value conversion table holding unit 120 holds difference value conversion table 120t having different codes written for each of a plurality of classifications corresponding to the size of difference value D(n) described above. As will be described below, a code string obtained based on difference value D(n) may be further used in discriminating the gas appliance.

For example, difference value conversion unit 112 converts difference value D(n) at each measurement timing into a corresponding code with reference to difference value conversion table 120t in addition to calculation of flow rate ratio R(n) described above. In this manner, a code string corresponding to a plurality of measurement timings is obtained. Table 5 below illustrates an example of difference value conversion table 120t.

TABLE 5

| Q(n) (L/h) | D(n) (L/h) | Code |
|---|---|---|
| Q(n) ≠ 0 | 400 < \| D(n) \| | F |
|  | 300 < \| D(n) \| ≤ 400 | E |
|  | 250 < \| D(n) \| ≤ 300 | D |
|  | 200 < \| D(n) \| ≤ 250 | C |
|  | 175 < \| D(n) \| ≤ 200 | B |
|  | 150 < \| D(n) \| ≤ 175 | A |
|  | 125 < \| D(n) \| ≤ 150 | 9 |
|  | 100 < \| D(n) \| ≤ 125 | 8 |
|  | 75 < \| D(n) \| ≤ 100 | 7 |
|  | 50 < \| D(n) \| ≤ 75 | 6 |
|  | 40 < \| D(n) \| ≤ 50 | 5 |
|  | 30 < \| D(n) \| ≤ 40 | 4 |
|  | 20 < \| D(n) \| ≤ 30 | 3 |
|  | 10 < \| D(n) \| ≤ 20 | 2 |
|  | 0 < \| D(n) \| ≤ 10 | 1 |
|  | \| D(n) \| = 0 | 0 |
| Q(n) = 0 | difference value zero | 0 |

For example, in a case where the flow rate value as illustrated in Table 4 above is obtained, the code string of "07614211000000110" is obtained (however, here, a code value at measurement timing "0" is "0"). The code string simulates the pattern of the flow rate change when the gas appliance which starts to be used is operated.

The generated code string can be used in discriminating the gas appliance which starts to be used. Appliance characteristic extraction unit 114 may acquire the generated code string as one of the appliance characteristic quantities from difference value conversion unit 112. If the code strings are calculated in advance for each of the gas appliances and these code strings are stored as the appliance inherent characteristic quantity in appliance inherent characteristic information holding unit 118, it is possible to compare the code string acquired from difference value conversion unit 112 with the code string held by appliance inherent characteristic information holding unit 118. For example, appliance discrimination unit 116 compares the intermediate flow rate extracted by appliance characteristic extraction unit 114 with the intermediate flow rate (or the intermediate stable flow rate) held by appliance inherent characteristic information holding unit 118. In addition to this comparison, appliance discrimination unit 116 can compare the code string serving as the appliance characteristic quantity with the code string serving as the appliance inherent characteristic quantity. Since the code strings are further compared with each other, the discriminating accuracy can be improved. In this example, the numbers of "0" to "9" or the alphabets of "A" to "F" are associated with each classification of the difference value. Accordingly, the code string can be handled as a hexadecimal number. Compared to a case where a value of difference value D(n) is used in discriminating the gas appliance as it is, an advantageous effect can be obtained in that the memory is saved and calculating speed is improved.

The code string acquired from difference value conversion unit 112 may be directly used in discriminating the gas appliance. Alternatively, as will be described below, a compressed code string may be generated from the code string so that the compressed code string is used as the appliance characteristic quantity.

For example, appliance characteristic extraction unit 114 may generate the compressed code string based on at least one of the maximum and the minimum in the code string, as one of the appliance characteristic quantities. For example, appliance characteristic extraction unit 114 generates compressed code string "07140" from code string "07614211000000110" described above. As can be understood from Table 5, a great code value reflects that the flow rate value is greatly changed at the sampling interval, and a small code value reflects that the flow rate value is changed a little at the sampling interval. Therefore, compressed code string "07140" represents a major change in the flow rate value.

In this case, in addition to the intermediate flow rate (or the intermediate stable flow rate), the characteristic code string indicating a characteristic flow rate state of the gas appliance to be detected is pre-stored as the appliance inherent characteristic quantity in appliance inherent characteristic information holding unit 118. According to one aspect, in discriminating the gas appliance which starts to be used, appliance discrimination unit 116 compares the intermediate flow rate extracted by appliance characteristic extraction unit 114 with the intermediate flow rate (or the intermediate stable flow rate) held by appliance inherent characteristic information holding unit 118. In addition to this comparison, appliance characteristic extraction unit 114 compares the compressed code string generated by appliance characteristic extraction unit 114 with the characteristic code string held by appliance inherent characteristic information holding unit 118. For example, in a case where the intermediate flow rate extracted by appliance characteristic extraction unit 114 falls within a predetermined range centered on the intermediate flow rate (or the intermediate stable flow rate) corresponding to the gas fan heater and the compressed code string coincides with the characteristic code string of the gas fan heater, it is possible to determine that the gas appliance which starts to be used is the gas fan heater.

Figure 7:
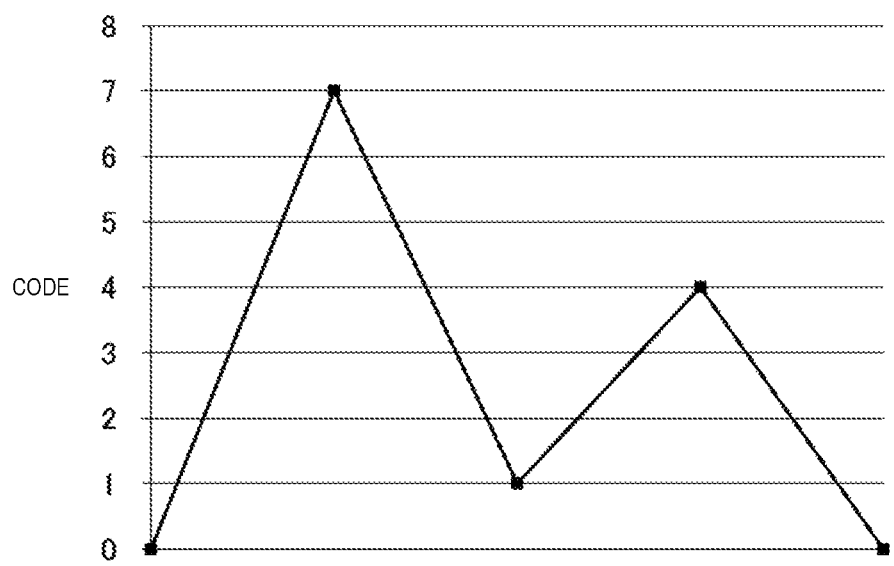
FIG. 7 is a graph of compressed code string "07140" when code values are arrayed on a vertical axis.

FIG. 7 illustrates a graph of compressed code string "07140" when the code values are arrayed on the vertical axis. FIG. 7 corresponds to the graph of the flow rates illustrated in FIG. 5. As illustrated in FIG. 7, two maximums (code values "7" and "4") and a minimum (code value "1") interposed between the maximums appear in the compressed code string.

A rapid decrease in the code value in the compressed code string reflects that the increasing rate of the flow rate is rapidly lowered in the pattern of the flow rate change, and a rapid increase in the code value in the compressed code string reflects that the increasing rate of the flow rate is rapidly raised in the pattern of the flow rate change. Therefore, a portion corresponding to the slow ignition in the pattern of the flow rate change can be detected by detecting the V-shaped transition in the graph of the compressed code string.

According to one aspect, appliance characteristic extraction unit 114 detects the transition of decrease-increase-decrease in the pattern of the compressed code string. For example, appliance characteristic extraction unit 114 determines whether or not a first code value of three consecutive code values in the compressed code string is greater than a central code value and a difference value therebetween is equal to or greater than a first predetermined value (for example, "5" in the code value). In addition, appliance characteristic extraction unit 114 determines whether or not a final code value of three consecutive code values in the compressed code string is greater than the central code value and a difference value therebetween is equal to or greater than a second predetermined value (for example, "2" in the code value). In this example, second code value "7" in compressed code string "07140" is greater than subsequent code value "1", and difference 6 therebetween is 5 or greater. In addition, third code value "4" in compressed code string "07140" is greater than code value "1" immediately before third code value "4", and difference 3 therebetween is 2 or greater. Therefore, it is possible to determine that the V-shaped transition appears in the pattern of the compressed code string.

In a case where it is determined that the V-shaped transition appears in the pattern of the compressed code string, appliance characteristic extraction unit 114 extracts a value calculated from the two flow rate values used in generating the central code value of the three consecutive code values, as the appliance characteristic quantity. In this example, code value "1" in compressed code string "07140" is obtained by converting difference value D(3) between Q(3) and Q(2) into a code, based on difference value conversion table 120t. Therefore, for example, appliance characteristic extraction unit 114 extracts average A(3) of Q(3) and Q(2), as the appliance characteristic quantity.

In this way, the appliance characteristic quantity may be extracted, based on the V-shaped transition in the pattern of the compressed code string. The appliance characteristic quantity based on the V-shaped transition in the pattern of the compressed code string is effectively extracted in a case where the appliance characteristic quantity is less likely to be extracted using flow rate ratio R(n).

(Hardware Configuration)

Figure 8:
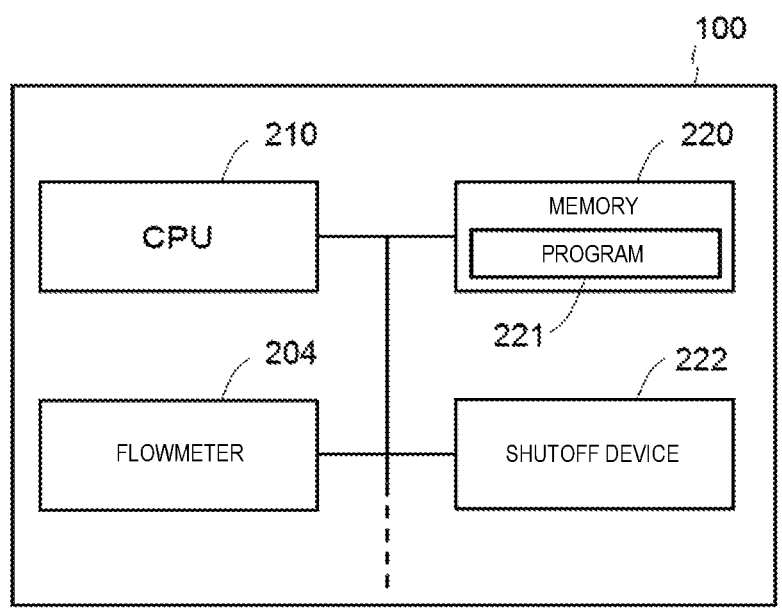
FIG. 8 is a block diagram illustrating an example of a hardware configuration of the gas meter according to the exemplary embodiment of the present invention.

FIG. 8 illustrates an example of a hardware configuration of gas meter 100. In the configuration illustrated in FIG. 8, gas meter 100 has central processing unit (CPU) 210, memory 220, flowmeter 204, and shutoff device 222. Flowmeter 204 is an example of flow rate measurement unit 104 illustrated in FIGS. 1 and 3, and may be a known flowmeter, for example, an ultrasonic flowmeter. Shutoff device 222 is an example of shutoff unit 122 illustrated in FIGS. 1 and 3, and may employ a known shutoff device, for example, a shutoff valve.

CPU 210 executes computer program 221 stored in memory 220. Various processes described above are written in computer program 221. For example, CPU 210 executes various processes of arithmetic unit 108, difference value conversion unit 112, appliance characteristic extraction unit 114, appliance discrimination unit 116, and reference range providing unit 110 which are illustrated in FIGS. 1 and 3. Memory 220 typically includes a RAM and a ROM. For example, memory 220 corresponds to measured flow rate information storage unit 106, difference value conversion table holding unit 120, and appliance inherent characteristic information holding unit 118 which are illustrated in FIGS. 1 and 3. Reference range providing unit 110 may partially include memory 220. A reference value for determining gas shutoff can be stored in memory 220.

Each of arithmetic unit 108, difference value conversion unit 112, appliance characteristic extraction unit 114, appliance discrimination unit 116, and reference range providing unit 110 may be a portion of a single processor (CPU 210). Control unit 105 may be realized in a combination of a plurality of processors. Control unit 105 may include one or more memories and a peripheral circuit. One or more memories may be located outside control unit 105. For example, measured flow rate information storage unit 106 may be located outside control unit 105. The above-described various processes are performed using CPU 210 and memory 220, thereby enabling the appliance to be accurately discriminated.

Hitherto, the exemplary embodiment according to the present invention has been described. The above description of the exemplary embodiment is merely an example of the present invention, and the exemplary embodiment is not intended to limit the present invention. In addition, it is also possible to adopt an exemplary embodiment in which the respective configuration elements described in the above-described exemplary embodiment are appropriately combined with each other. The present invention can be modified, substituted, added, or omitted within the scope of claims or their equivalent.

As described above, the flow measurement device according to the present invention includes the flow rate measurement unit that measures the flow rate of the gas flowing through the flow path at the prescribed time interval, the arithmetic unit that calculates the difference value between the first flow rate value measured at a certain measurement timing and the second flow rate value measured at a measurement timing immediately prior to the certain measurement timing, and the difference value conversion unit that calculates the flow rate ratio, based on the difference value. In addition, the flow measurement device includes the appliance characteristic extraction unit that extracts at least one appliance characteristic quantity indicating the characteristic of the flow rate change in the currently using gas appliance, and that extracts the value calculated from the first flow rate value and the second flow rate value as at least one appliance characteristic quantity, in the case where the flow rate ratio falls within the reference range. Furthermore, the flow measurement device includes the appliance inherent characteristic information holding unit that holds one or more appliance inherent characteristic quantities indicating the characteristic flow rate state of the specific gas appliance, and the appliance discrimination unit that discriminates the currently using gas appliance, based on the comparison between the appliance characteristic quantity extracted by the appliance characteristic extraction unit and the appliance inherent characteristic quantity corresponding to the appliance characteristic quantity out of the one or more appliance inherent characteristic quantities held by the appliance inherent characteristic information holding unit. Then, the plurality of flow rate zones are set to correspond to the flow rate of the gas flowing through the flow path, and the reference range is determined in accordance with the flow rate zone to which the first flow rate value belongs.

In addition, in the flow measurement device according to the present invention, the reference range in the first flow rate zone may be wider than the reference range in the second flow rate zone having the higher flow rate than the first flow rate zone.

In addition, the flow measurement device according to the present invention may further include the reference range providing unit that receives the input of the first flow rate value, and that returns the data of the reference range corresponding to the flow rate zone to which the first flow rate value belongs, to the appliance characteristic extraction unit.

In addition, the flow measurement device according to the present invention may adopt a configuration as follows. The reference range providing unit may refer to the flow rate value conversion table in which the flow rate zone to which the first flow rate value belongs and the reference range are associated with each other. In this manner, the reference range providing unit may supply the data of the reference range corresponding to the flow rate zone to which the first flow rate value belongs, to the appliance characteristic extraction unit.

In addition, in the flow measurement device according to the present invention, the reference range providing unit pre-holds the reference data and the correction factor varying in accordance with the flow rate zone to which the first flow rate value belongs. Then, a configuration may be adopted as follows. The reference range providing unit multiplies the reference data by the correction factor so as to calculate the reference range corresponding to the flow rate zone to which the first flow rate value belongs. In this manner, reference range providing unit supplies the data of the reference range corresponding to the flow rate zone to which the first flow rate value belongs, to the appliance characteristic extraction unit.

In addition, the flow measurement device according to the present invention may adopt a configuration as follows. The difference value conversion unit calculates the flow rate ratio, in a case where the first flow rate value is in the range from the first predetermined flow rate to the second predetermined flow rate.

In addition, the flow measurement device according to the present invention may adopt a configuration as follows. The difference value conversion unit stops calculating the flow rate ratio after the appliance characteristic extraction unit extracts at least one of the appliance characteristic quantities.

In addition, in the flow measurement device according to the present invention, the appliance characteristic extraction unit is in a state where at least one of the appliance characteristic quantities is previously extracted as the appliance characteristic quantity. In addition, in this case, the third flow rate value measured at the measurement timing later than the certain measurement timing is in the range from the first predetermined flow rate to the second predetermined flow rate, and the flow rate ratio calculated corresponding to the third flow rate value is closer to 0 than the flow rate ratio calculated corresponding to the first flow rate value. Then, a configuration may be adopted as follows. The appliance characteristic quantity is updated to the value calculated from the third flow rate value and the flow rate value measured at the measurement timing immediately prior to the measurement timing of the third flow rate value.

In addition, in the flow measurement device according to the present invention, the difference value conversion unit may be configured to stop calculating the flow rate ratio after the appliance characteristic quantity is up dated.

In addition, the flow measurement device according to the present invention may further include the difference value conversion table holding unit that holds the difference value conversion table having different codes written for each of the plurality of classifications corresponding to the size of the difference value. The difference value conversion unit may be configured to calculate the flow rate ratio and convert the difference value to the corresponding code with reference to the difference value conversion table.

In addition, in the flow measurement device according to the present invention, the appliance characteristic extraction unit further acquires the code string from the difference value conversion unit, and generates the compressed code string as at least one of the appliance characteristic quantities, based on at least one of the maximum and the minimum in the code string. In addition, the appliance inherent characteristic information holding unit pre-holds the characteristic code string indicating the characteristic flow rate state of the specific gas appliance, as one of the one or more appliance inherent characteristic quantities. Then, the appliance discrimination unit may be configured to discriminate the currently using gas appliance by further comparing the compressed code string generated by the appliance characteristic extraction unit with the characteristic code string held by the appliance inherent characteristic information holding unit.

In addition, the flow measurement device according to the present invention includes the flow rate measurement unit that measures the flow rate of the gas flowing through the flow path at the prescribed time interval, the arithmetic unit that calculates the difference value between the flow rate value measured at a certain measurement timing and the flow rate value measured at the measurement timing immediately prior to the certain measurement timing, and the difference value conversion unit that calculates the flow rate ratio, based on the difference value. In addition, the flow measurement device according to the present invention includes the appliance characteristic extraction unit that extracts the appliance characteristic quantity indicating the characteristic of the flow rate change in the currently used gas appliance, and the appliance inherent characteristic information holding unit that holds the appliance inherent characteristic quantity indicating the characteristic flow rate state of the specific gas appliance. In addition, the flow measurement device according to the present invention includes the appliance discrimination unit that discriminates the currently using gas appliance, based on the comparison between the appliance characteristic quantity and the appliance inherent characteristic quantity. In addition, when the following conditions are satisfied, the appliance characteristic extraction unit may be configured to extract the value calculated using any one of the flow rate value used in calculating the second flow rate ratio and the flow rate value used in calculating the fourth flow rate ratio, as the appliance characteristic quantity. One condition is that the first flow rate ratio calculated corresponding to the first measurement timing is greater than the second flow rate ratio calculated corresponding to the second measurement timing which is one step later than the first measurement timing, and that the difference value between the first flow rate ratio and the second flow rate ratio is equal to or greater than the first predetermined value. Another condition is that the third flow rate ratio calculated corresponding to the third measurement timing which is later than the second measurement timing is greater than the fourth flow rate ratio calculated corresponding to the fourth measurement timing immediately prior to the third measurement timing, and that the difference value between the third flow rate ratio and the fourth flow rate ratio is equal to or greater than the second predetermined value.

INDUSTRIAL APPLICABILITY

According to the exemplary embodiment of the present invention, it is possible to more reliably acquire the flow rate indicating the characteristic of the gas appliance, such as the intermediate flow rate. Therefore, the present invention is useful to the gas meter having a function to discriminate the gas appliance.

REFERENCE MARKS IN THE DRAWINGS 13 to 15 GAS APPLIANCE
100 GAS METER
102 FLOW PATH
104 FLOW RATE MEASUREMENT UNIT
105 CONTROL UNIT
106 MEASURED FLOW RATE INFORMATION STORAGE UNIT
108 ARITHMETIC UNIT
110 REFERENCE RANGE PROVIDING UNIT
112 DIFFERENCE VALUE CONVERSION UNIT
114 APPLIANCE CHARACTERISTIC EXTRACTION UNIT
116 APPLIANCE DISCRIMINATION UNIT
118 APPLIANCE INHERENT CHARACTERISTIC INFORMATION HOLDING UNIT
120 DIFFERENCE VALUE CONVERSION TABLE HOLDING UNIT
122 SHUTOFF UNIT

The invention claimed is:

1. A flow measurement device comprising:
a flow rate measurement unit that measures a flow rate of gas at a prescribed time interval, the gas flowing through a flow path;
an arithmetic unit that calculates a difference value between a first flow rate value measured at a certain measurement timing and a second flow rate value measured at a measurement timing immediately prior to the certain measurement timing;
a difference value conversion unit that calculates a flow rate ratio, based on the difference value;
an appliance characteristic extraction unit that extracts at least one appliance characteristic quantity indicating a characteristic of a flow rate change in an appliance currently using gas, and that extracts a value calculated from the first flow rate value and the second flow rate value as at least one appliance characteristic quantity, in a case where the flow rate ratio falls within a reference range;
an appliance inherent characteristic information holding unit that holds one or more appliance inherent characteristic quantities indicating a characteristic flow rate state of a specific gas appliance; and
an appliance discrimination unit that discriminates the appliance currently using gas, based on a comparison between the appliance characteristic quantity extracted by the appliance characteristic extraction unit and the appliance inherent characteristic quantity corresponding to the appliance characteristic quantity out of the one or more appliance inherent characteristic quantities held by the appliance inherent characteristic information holding unit, wherein a plurality of flow rate zones are each set to correspond to a different flow rate of the gas flowing through the flow path, wherein the reference range is determined in accordance with a flow rate zone to which the first flow rate value belongs, the flow rate zone being included in the plurality of flow rate zones, and a reference range is set for each flow rate zone to which the measured flow rate of gas belongs, and the reference zones differ depending on the measured flow rate.

2. The flow measurement device of claim 1,
wherein the reference range in a first flow rate zone is wider than the reference range in a second flow rate zone having a higher flow rate than the first flow rate zone, the first flow rate zone and the second flow rate zone being included in the plurality of flow rate zones.

3. The flow measurement device of claim 1 further comprising:
a reference range providing unit that receives an input of the first flow rate value, and returns data of the reference range in the flow rate zone to which the first flow rate value belongs, to the appliance characteristic extraction unit.

4. The flow measurement device of claim 3,
wherein the reference range providing unit supplies the data of the reference range in the flow rate zone to which the first flow rate value belongs, to the appliance characteristic extraction unit, with reference to a flow rate value conversion table in which the flow rate zone to which the first flow rate value belongs is associated with the reference range in the flow rate zone to which the first flow value belongs.

5. The flow measurement device of claim 3,
wherein the reference range providing unit pre-holds reference data and a correction factor varying in accordance with the flow rate zone to which the first flow rate value belongs, and
wherein the reference range providing unit calculates the reference range in the flow rate zone to which the first flow rate value belongs by multiplying the reference data by the correction factor, and supplies the data of the reference range in the flow rate zone to which the first flow rate value belongs, to the appliance characteristic extraction unit.

6. The flow measurement device of any one of claim 1,
wherein the difference value conversion unit calculates the flow rate ratio, in a case where the first flow rate value is in a range of a first predetermined flow rate to a second predetermined flow rate, inclusive.

7. The flow measurement device of claim 6,
wherein in a state where the at least one appliance characteristic quantity is previously extracted as the appliance characteristic quantity, in a case where a third flow rate value measured at a measurement timing later than the certain measurement timing is in the range of the first predetermined flow rate to the second predetermined flow rate and the flow rate ratio calculated corresponding to the third flow rate value is closer to 0 than the flow rate ratio calculated corresponding to the first flow rate value, the appliance characteristic extraction unit updates the appliance characteristic quantity to a value obtained from the third flow rate value and the flow rate value measured at a measurement timing immediately prior to the measurement timing of the third flow rate value.

8. The flow measurement device of claim 7,
wherein the difference value conversion unit stops calculating the flow rate ratio after the appliance characteristic quantity is updated.

9. The flow measurement device of any one of claim 1,
wherein the difference value conversion unit stops calculating the flow rate ratio after the appliance characteristic extraction unit extracts the at least one appliance characteristic quantity.

10. The flow measurement device of any one of claim 1, further comprising:
a difference value conversion table holding unit that holds a difference value conversion table in which different codes are written for each of a plurality of classifications corresponding to a size of the difference value,
wherein the difference value conversion unit calculates the flow rate ratio, and converts the difference value into a corresponding code with reference to the difference value conversion table.

11. The flow measurement device of claim 10,
wherein the appliance characteristic extraction unit further acquires a string of the code from the difference value conversion unit, and generates a compressed code string based on at least one of maximum and minimum in the string of the code as the at least one appliance characteristic quantity,
wherein the appliance inherent characteristic information holding unit pre-holds a characteristic code string indicating a characteristic flow rate state of the specific gas appliance, as one of the one or more appliance inherent characteristic quantities, and
wherein the appliance discrimination unit discriminates the currently using gas appliance by comparing the compressed code string generated by the appliance characteristic extraction unit with the characteristic code string held by the appliance inherent characteristic information holding unit.

12. A flow measurement device comprising:
a flow rate measurement unit that measures a flow rate of gas at a prescribed time interval, the gas flowing through a flow path;
an arithmetic unit that calculates a difference value between a flow rate value measured at a certain measurement timing and a flow rate value measured at a measurement timing immediately prior to the certain measurement timing;
a difference value conversion unit that calculates a flow rate ratio, based on the difference value;
an appliance characteristic extraction unit that extracts an appliance characteristic quantity indicating a characteristic of a flow rate change in an appliance currently using gas;
an appliance inherent characteristic information holding unit that holds an appliance inherent characteristic quantity indicating a characteristic flow rate state of a specific gas appliance; and
an appliance discrimination unit that discriminates the appliance currently using gas, based on a comparison between the appliance characteristic quantity and the appliance inherent characteristic quantity,
wherein when a first flow rate ratio calculated corresponding to a first measurement timing is higher than a second flow rate ratio calculated corresponding to a second measurement timing which is one step later than the first measurement timing, when a difference value between the first flow rate ratio and the second flow rate ratio is equal to or greater than a first predetermined value, when a third flow rate ratio calculated corresponding to a third measurement timing which is later than the second measurement timing is higher than a fourth flow rate ratio calculated corresponding to a fourth measurement timing immediately prior to the third measurement timing, and when a difference value between the third flow rate ratio and the fourth flow rate ratio is equal to or greater than a second predetermined value, the appliance characteristic extraction unit extracts a value calculated using at least any one of the flow rate value used in calculating the second flow rate ratio and the flow rate value used in calculating the fourth flow rate ratio, as the appliance characteristic quantity.

* * * * *